United States Patent
Zhang (10) Patent No.: US 12,511,740 B2
(45) Date of Patent: Dec. 30, 2025

(54) MEDICAL IMAGE ANALYSIS METHOD BASED ON DEEP LEARNING MODEL

(71) Applicants: Han-Wei Zhang, New Taipei (TW); Biomedica Corporation, Grand Cayman (KY)

(72) Inventor: Han-Wei Zhang, New Taipei (TW)

(73) Assignees: BIOMEDICA CORPORATION, Grand Cayman (KY); Han-Wei Zhang, New Taipei (TW)

(*) Notice: Subject to any disclaimer, the term of this patent is extended or adjusted under 35 U.S.C. 154(b) by 324 days.

(21) Appl. No.: 18/125,219

(22) Filed: Mar. 23, 2023

(65) Prior Publication Data

US 2023/0306591 A1    Sep. 28, 2023

(30) Foreign Application Priority Data

Mar. 25, 2022 (TW) ................... 111111490
Mar. 25, 2022 (TW) ................... 111111491

(51) Int. Cl.
    *G06T 7/00* (2017.01)

(52) U.S. Cl.
    CPC .. *G06T 7/0012* (2013.01); *G06T 2207/20084* (2013.01)

(58) Field of Classification Search
    CPC ......... G06T 7/0012; G06T 2207/20084; G06T 2207/10016; G06T 2207/10116; G06T 2207/30008; G06T 7/0014
    See application file for complete search history.

(56) References Cited

U.S. PATENT DOCUMENTS

| | | | |
|---|---|---|---|
| 2020/0402229 A1* | 12/2020 | Chen | G06T 7/11 |
| 2022/0262010 A1* | 8/2022 | Shpuza | G06V 20/46 |
| 2023/0177717 A1* | 6/2023 | Tank | H04N 23/51 |
| | | | 382/103 |

FOREIGN PATENT DOCUMENTS

| | | |
|---|---|---|
| CN | 108682001 A | 10/2018 |
| CN | 110880366 A | 3/2020 |
| CN | 112070760 A | 12/2020 |
| CN | 113284136 A | 8/2021 |
| JP | 2021-144675 A | 9/2021 |
| WO | WO 2021/221008 A1 | 11/2021 |

OTHER PUBLICATIONS

Zheng et al. "Semi-supervised Learning for Bone Mineral Density Estimation in Hip X-Ray Images"; 2021 MICCAI 2021, pp. 33-42. (Year: 2021).*

* cited by examiner

*Primary Examiner* — Siamak Harandi
(74) *Attorney, Agent, or Firm* — Birch, Stewart, Kolasch & Birch, LLP (57) ABSTRACT

A medical image analysis method is executed by a computer and includes: receiving medical images; selecting at least one detection area in the medical image; performing image standardization processing on a target image in the detection area to obtain a to-be-analyzed image; and inputting the to-be-analyzed image into an image classification model to obtain a disease analysis result.

10 Claims, 13 Drawing Sheets

MEDICAL IMAGE ANALYSIS METHOD BASED ON DEEP LEARNING MODEL

CROSS-REFERENCES TO RELATED APPLICATIONS

This non-provisional application claims priority under 35 U.S.C. § 119(a) to Patent Application No. L11111490 filed in Taiwan, R.O.C. on Mar. 25, 2022 and Patent Application No, 111111491 filed in Taiwan, R.O.C. on Mar. 25, 2022, the entire contents of which are hereby incorporated by reference.

BACKGROUND

Technical Field

The present disclosure relates to an image analysis method, and particularly refers to a medical image analysis method utilizing a neural network model.

Related Art

A dual energy x-ray absorptiometry (DXA), commonly known as a bone densitometer, can generate dual energy X-rays. The X-rays of different energy are attenuated at different levels by different media. The higher the density of the media is, the larger the attenuation of the X-rays is. Therefore, the bone density of each part of a body can be detected. However, the measurement time of the DXA is generally 15-20 min, the instrument cost is higher than that of a general X-ray machine, so it is not conducive to the promotion of public detection.

In addition, it is generally needed to analyze the images of tissue slices in medical disease detection, and the types and severity of diseases can be analyzed by cell samples obtained from smear examination. However, manual examination costs a lot of time and energy, and misjudgment is easily caused.

SUMMARY

An example of the present disclosure provides a medical image analysis method. The medical image analysis method is executed by a computer and includes: receiving medical images; selecting at least one detection area in the medical image; performing image standardization processing on a target image in the detection area to obtain a to-be-analyzed image; and inputting the to-be-analyzed image to an image classification model to obtain a disease analysis result.

According to the medical image analysis method provided by the example of the present disclosure, possible diseases can be automatically analyzed according to the medical images. According to some examples, a risk value can be further analyzed.

DETAILED DESCRIPTION

Figure 1:
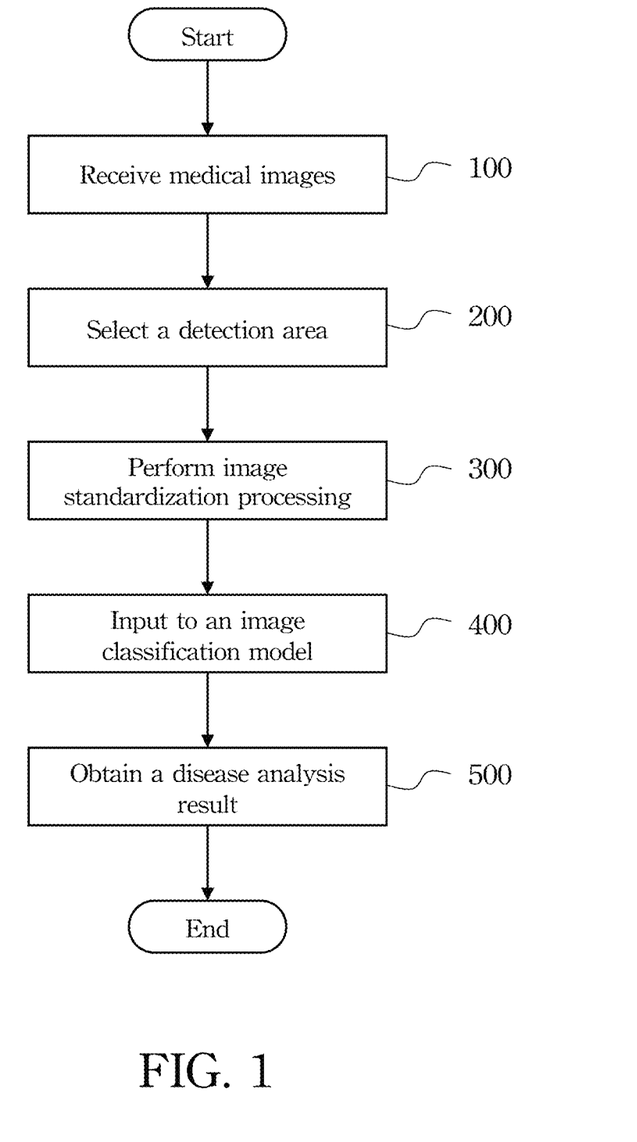
FIG. 1 is a flowchart of a medical image analysis method according to an example of the present disclosure.

Refer to FIG. 1, a flow chart of a medical image analysis method according to an example of the present disclosure. The method comprises a first step of receiving a medical image (step 100). Corresponding medical images can be used according to the type of a disease to be identified. For example, an X-ray image can be used for identifying osteoporosis, a cervix smear cell image can be used for identifying cervical cancer, and a bone marrow smear cell image can be used for identifying leukemia.

In some examples, the X-ray image for identifying osteoporosis is a spinal X-ray image, a femoral X-ray image, a clavicle X-ray image or a metacarpal X-ray image. Whether a corresponding part has fine texture structure change caused by bone loss can be determined by analyzing the characteristics of the spinal X-ray image, the femoral X-ray image, the clavicle X-ray image or the metacarpal X-ray image, and thus whether the osteoporosis occurs can be estimated. The X-ray images are obtained by a diagnostic X-ray machine, a mobile X-ray machine or an X-ray machine patrol vehicle, and the device cost and measurement time are lower than those of a traditional dual energy X-ray absorptiometry.

A step 200 comprises: selecting at least one detection area in the medical image. For example, for the femoral X-ray image, a femoral neck part is used as the detection area.

In some examples, the step 200 also comprises: providing a user interface for a user to select the detection area.

In some examples, the step 200 is implemented through an object detection model. The object detection model can be a Mask R-CNN model, a YOLO model and the like. The object detection model needs to be trained in advance; and multiple sample images and corresponding labeled areas containing detection targets (such as the femoral neck part and cells) are input to the object detection model to train the object detection model to detect the femoral neck part in the femoral X-ray image or a cell individual in a smear image.

A step 300 comprises: performing image standardization processing on a target image in the detection area to obtain a to-be-analyzed image. In order to describe fluently, detail processes of the image standardization processing are described later. Through the image standardization processing, an image with a proper size and clear required details can be obtained and is suitable to be input to an image classification model.

A step 400 comprises: inputting the processed to-be-analyzed image to the image classification model; and a step 500 comprises: obtaining a disease analysis result according to the output of the image classification model. The image classification model is a neural network model, and an implementation mode of the image classification model is described in detail later. The disease analysis result can be, for example, whether a specific disease (such as osteoporosis, cervical cancer and leukemia) occurs or the course of the specific disease can be further estimated.

In some examples, the size of the detection area is determined according to the input specification of the neural network model. For example, if the size of an image suitable for being input to the neural network model is 224×224 in pixels, the size of the detection area is also 224×224 in pixels.

Figure 2:
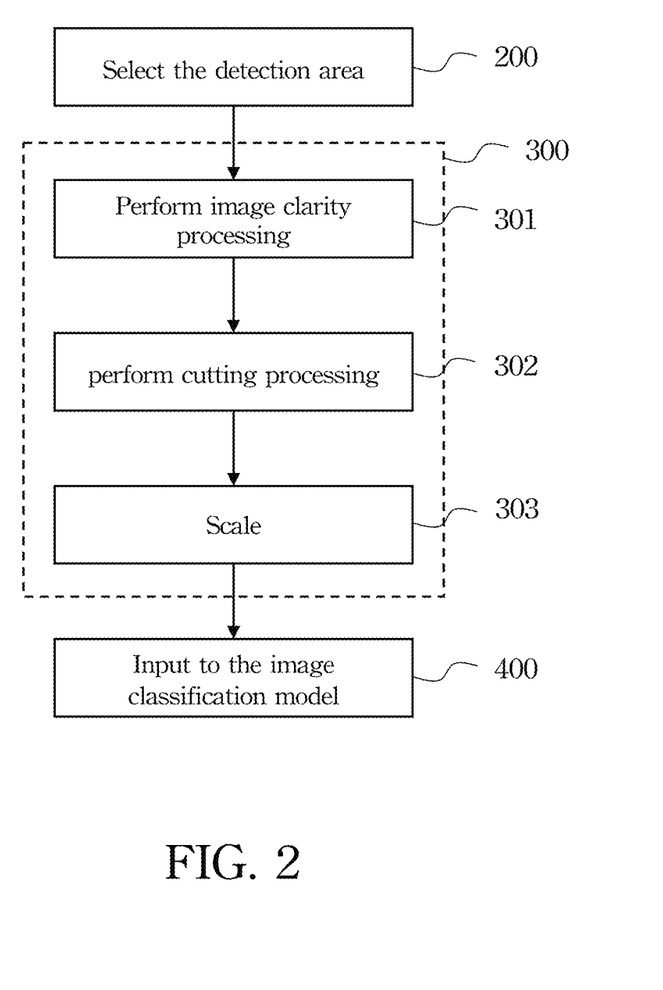
FIG. 2 is a detail flowchart of image standardization processing according to an example of the present disclosure.

Refer to FIG. 2, a detail flowchart of image standardization processing according to an example of the present disclosure. The image standardization processing in step 300 includes image clarity processing (step 301), minimum edge cutting (step 302) and scaling (step 303).

The step 301 comprises: performing Sharpen processing or equalization processing (such as histogram equalization) to make image details clearer. Before the Sharpen processing or equalization processing, gray-scale processing is also performed to transform a colored target image into a gray-scale image. If the target image is the gray-scale image, the gray-scale processing is saved.

The step 302 comprises: performing cutting processing on the target image. If the size of the target image does not conform to the required size of the above neural network model, the target image is cut to a corresponding size. For example, if the target image is a rectangle, a long side is cut by taking a short side as a reference so as to obtain a square image.

The step 303 comprises: performing scaling (scaling down or up at the same proportion) if the size of the image processed in the step 302 does not conform to the size of the above neural network model so as to obtain the size required by the above neural network model. The to-be-analyzed can be obtained by preprocessing the target image in the above steps 301-303.

Figure 3:
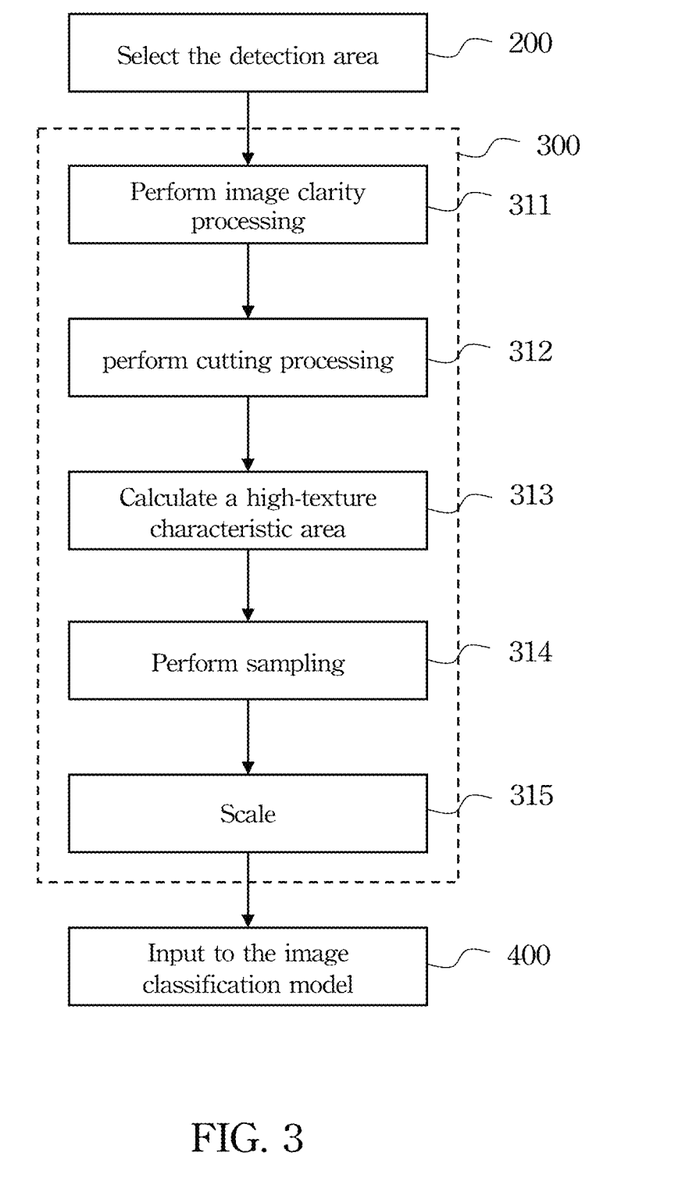
FIG. 3 is a detail flowchart of image standardization processing according to another example of the present disclosure.

Refer to FIG. 3, a detail flowchart of image standardization processing according to another example of the present disclosure. Compared with FIG. 2, the image standardization processing in the example also includes a high-texture characteristic area calculation step (step 313) and a range sampling step (step 314). Steps 311, 312 and 315 are correspondingly the same as steps 301, 302 and 303 and are not repeated herein.

The step 313 comprises: detecting textures in the image by an edge detection algorithm. The edge detection algorithm can be a Canny algorithm, a Sobel algorithm, etc. Particularly for the identification of osteoporosis, an area with the most bone textures can be found through the step 313.

The step 314 comprises: enlarging a specific range according to the center of the area with the most bone textures found in the step 313, randomly sampling multiple area images with the same size as the detection area from the specific range, and inputting the area images to the image classification model in a subsequent step 400. Therefore, the sampled area images conform to the size required by the neural network model, and the step 315 can be saved.

Figure 4:
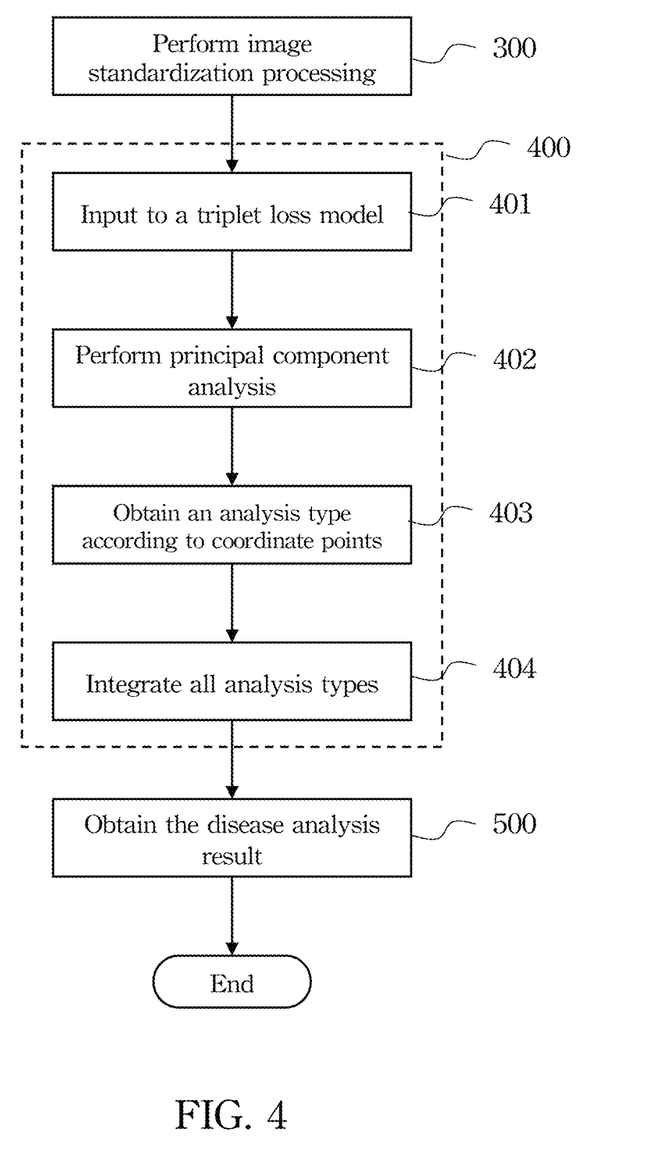
FIG. 4 is a detail flowchart of image classification processing according to an example of the present disclosure.

Refer to FIG. 4, a detail flowchart of image classification processing according to an example of the present disclosure. A step 401 comprises: inputting the above to-be-analyzed images or area images to the image classification model. The image classification model is a triplet loss model herein. The triplet loss model is used for training a data set with small difference. Input data include an anchor example, a positive example and a negative example. The distance between the anchor example and the positive example is smaller than that between the anchor example and the negative example by optimizing the model, so that similarity calculation of samples is realized. The anchor example is a sample randomly selected from a sample set, the positive example and the anchor example belong to the same type of samples, and the negative example and the anchor example belong to different types of samples. Therefore, the image characteristics can be grouped through the triplet loss model. For example, the image characteristics are distinguished into a group with osteoporosis and a group without osteoporosis. For the above identification of cervical cancer and leukemia, cell individuals in the to-be-analyzed images or the area images are grouped to identify different types of cells. Each to-be-analyzed image or each area image only has one cell individual image.

The step 402 comprises: performing dimension reduction on the output result of the triplet loss model through principal component analysis (PCA). The PCA is to find a projection axis in a characteristic space for data, and the maximum variation of this group of data can be obtained after projection. Therefore, the number of dimensions can be effectively reduced, but the overall variation is not reduced too much. Then, the dimension of the grouping result can be reduced by the PCA to obtain distribution coordinate information of each group. Through steps 401 and 402, the to-be-analyzed images or area images input to the triplet loss model can be transformed into a coordinate point.

The step 403 comprises: determining the group range of the coordinate point according to the distribution coordinate information of each group obtained in the training process so as to obtain the corresponding group (or called analysis type) of the image.

The step 404 comprises: integrating all analysis types. That is, the obtained analysis type corresponding to each to-be-analyzed image or each area image captured from the same medical image is integrated. For example, if three area images are captured from the same medical image, one analysis type can be correspondingly obtained from the three area images after the above steps 401 to 403; and the step 404 is to integrate the three analysis types, so that the disease analysis result can be obtained according to the integration result in the step 500. Specifically, the majority in the analysis types is taken as the disease analysis result. For example, if the three analysis types are two types with osteoporosis and one type without osteoporosis, the disease analysis result of suffering from the osteoporosis is determined according to the majority. For another example, if to-be-analyzed images (or area images) having N cell individuals are captured from the same medical image, the N cell individuals are grouped into K cell types after the above steps 401 to 403, the number of the cell individuals of each cell type can be counted in the step 404, and the disease type can be identified according to the number corresponding to the cell types in the step 500.

Figure 5:
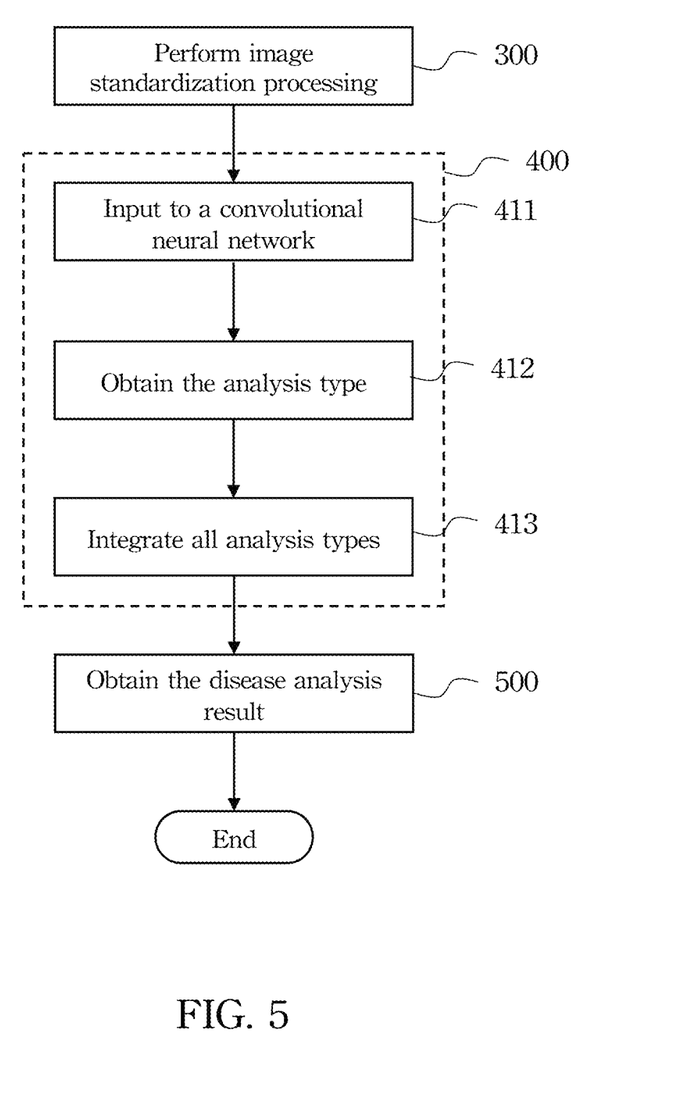
FIG. 5 is a detail flowchart of image classification processing according to another example of the present disclosure.

Refer to FIG. 5, a detail flowchart of image classification processing according to another example of the present disclosure. The difference from FIG. 4 is that convolutional neural networks (CNN) such as a deep residual network (ResNet), GoogleLeNet and DenseNet are used as the image classification models in this example. During model training, the to-be-analyzed images or area images of the medical image serving as a training sample are obtained according to the above mode, and the analysis type of the medical image is labeled and input to the model. The last layer of the convolutional neural network is a weight classifier (such as XGBoost), and the possible category probability is predicted according to the extracted characteristics. During prediction determination, the to-be-analyzed images or area images of the to-be-identified medical image obtained according to the above mode are input to the model (step 411) to obtain the analysis type for prediction (step 412), The step 413 is the same as the above step 404 and is not repeated herein.

Figure 6:
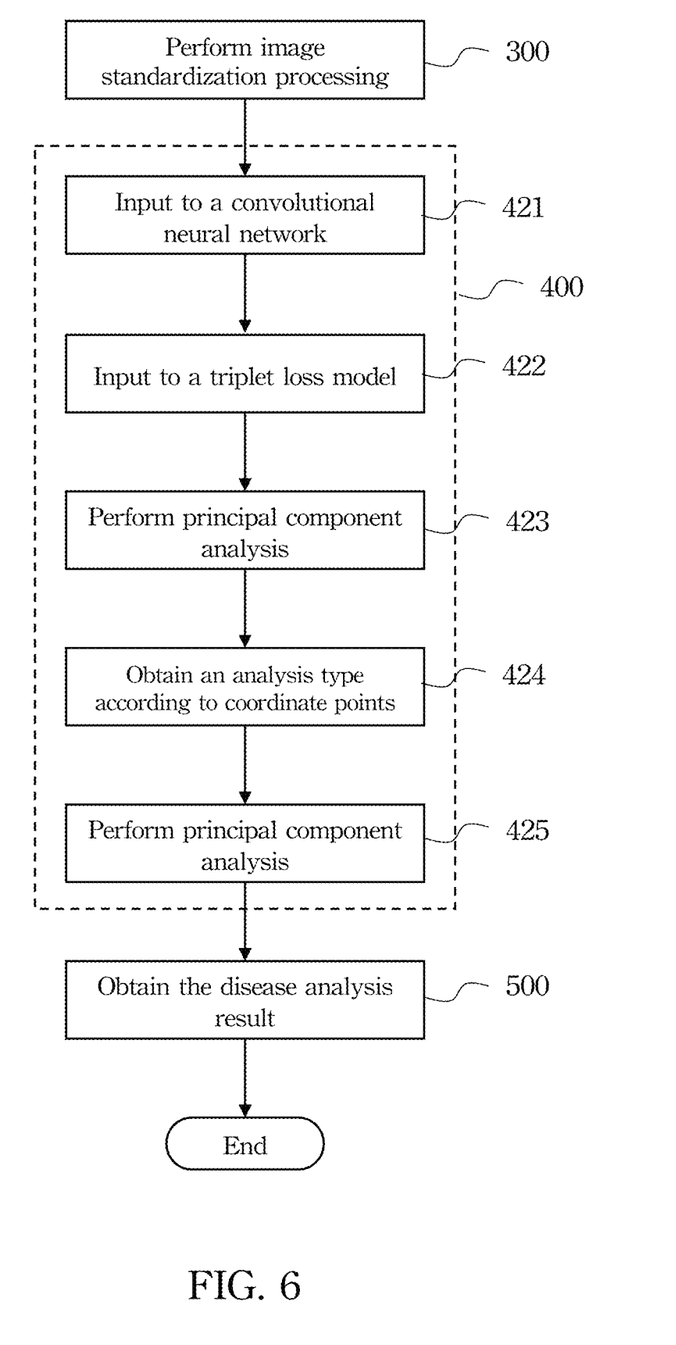
FIG. 6 is a detail flowchart of image classification processing according to still another example of the present disclosure.

FIG. 6 is a detail flowchart of image classification processing according to still another example of the present disclosure. The difference from FIGS. 4 and 5 is that the image classification model includes both the triplet loss model and the convolutional neural network in this example, the triplet loss model is connected after the convolutional neural network, and the convolutional neural network does not have the weight classifier at the end in this example. In step 421, the to-be-analyzed images are input to the convolutional neural network. Since the convolutional neural network here does not have the weight classifier, a characteristic vector is obtained through the output of the convolutional neural network. In step 422, the characteristic vector is input to the triplet loss model. Therefore, the to-be-analyzed images can be grouped by the triplet loss model according to the characteristic vector. Subsequent steps 423 to 425 are the same as the previous steps 402 to 404. Finally, the disease analysis result can be obtained according to the integration result in the step 500.

Figure 7:
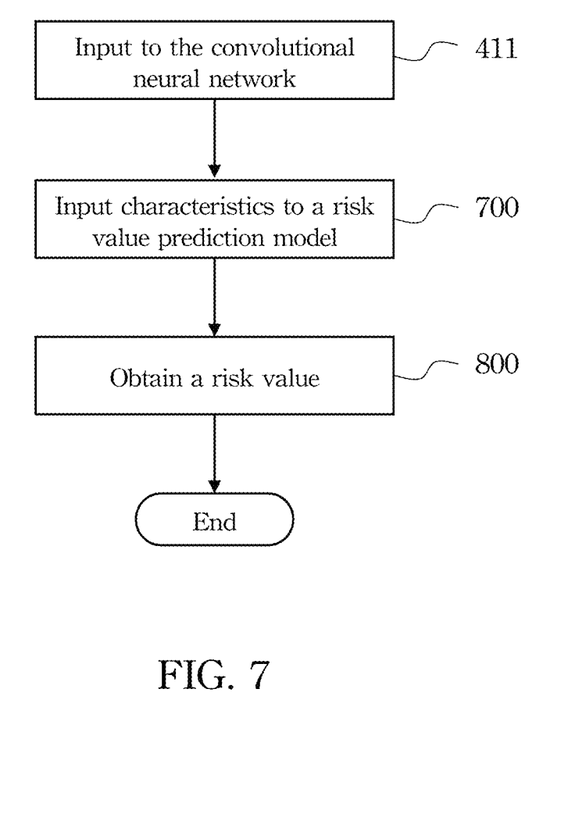
FIG. 7 is a detail flowchart of risk value prediction according to an example of the present disclosure.

Refer to FIG. 7, a detailed flowchart of risk value prediction according to an example of the present disclosure. According to the example as shown in the above FIG. 5, and in some examples, the characteristics extracted by the convolutional neural network can be repeatedly utilized. The extracted characteristics are input to another neural network model (called a risk value prediction model herein) (step 700). The risk value prediction model can be a multilayer perceptron (MLP) herein. During training, the extracted characteristics corresponding to the training sample and the corresponding risk value are input to the risk value prediction model, so that the risk value can be predicted according to the extracted characteristics of the to-be-identified sample during prediction determination (step 800). In an osteoporosis identification application, the risk value can be a T-scores parameter or a fracture risk assessment (FRAX) parameter for example. In a cervical cancer identification application, the risk value is a cell examination grading value or a disease course (such as a low-grade squamous intraepithelial lesion (LSIL) and a high-grade squamous intraepithelial lesion (HSIL)) of cervical cancer, and can represent the severity, as shown in Table 1.

TABLE 1

| Grade | Description |
|---|---|
| 1 | Normal |
| 2 | Benign response |
| 3 | Hormone deficiency atrophy |
| 4 | Atypical squamous cells of undetermined signification |
| 5 | Atypical glandular epithelial cells |
| 6 | LSIL Mild cellular degeneration with koilocytotic cell |
| 7 | Mild cellular degeneration without koilocytotic cell |
| 8 | HSIL Moderate cellular degeneration |

TABLE 1-continued

| Grade | Description |
|---|---|
| 9 | Severe cellular degeneration |
| 10 | Carcinoma in situ |
| 11 | Squamous cell carcinoma |
| 12 | Adenocarcinoma |
| 13 | Other malignant tumors |
| 14 | Other |
| 15 | Atypical glandular epithelial cells, suspected tumor |
| 16 | Atypical squamous cells, undetermined HSIL |
| 17 | Cytopathy, undetermined HSIL |

In some examples, besides the characteristics extracted by the convolutional neural network, other characteristics can also be input to the risk value prediction model, such as characteristics of personal data (like gender and age), physical body data (like body mass index (BMI), height and weight), and medical information (disease history (like diabetes and hypertension)). The characteristics can be input by a user through a user interface, and can also be read from a medical record database.

Figure 8:
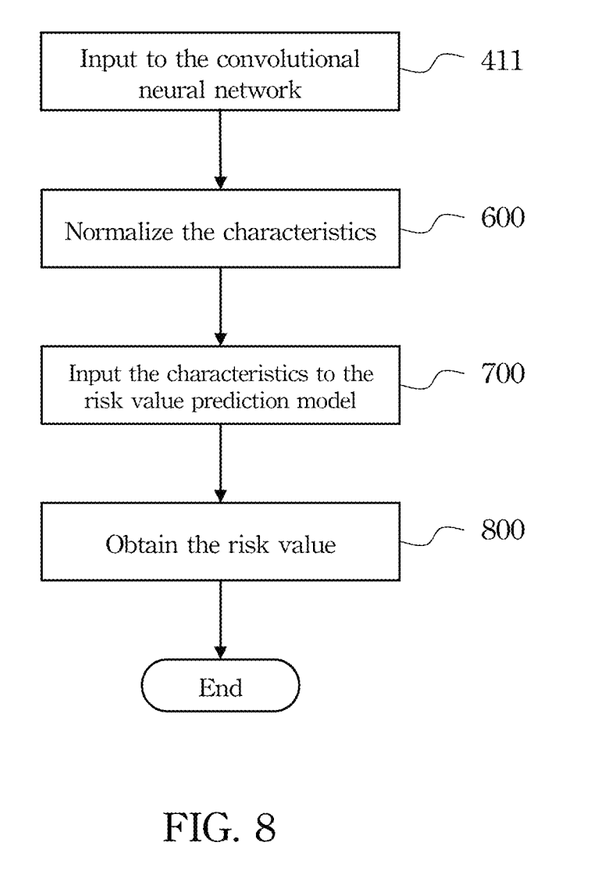
FIG. 8 is a detail flowchart of risk value prediction according to another example of the present disclosure.

Refer to FIG. 8, a detail flowchart of risk value prediction according to another example of the present disclosure. The difference from FIG. 7 is that a step 600 of normalizing the extracted characteristics into a numerical range between 0 and 1 is performed before a step 700.

Figure 9:
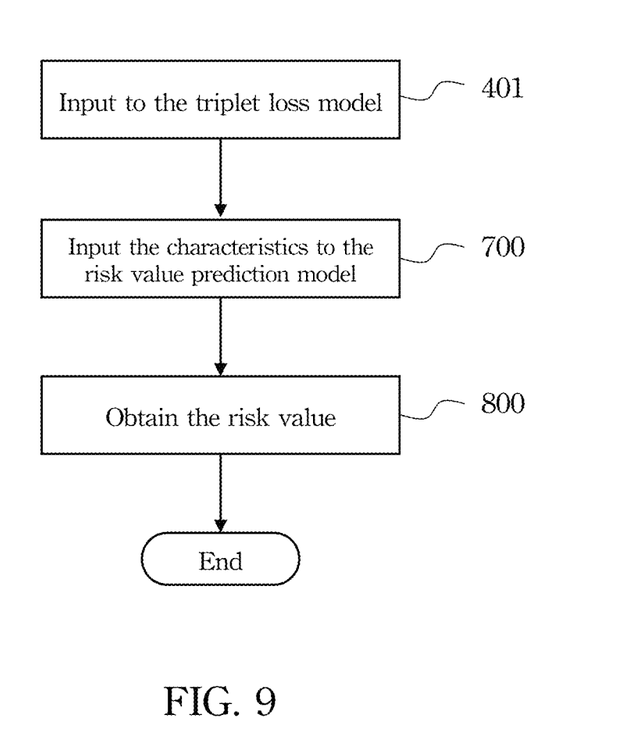
FIG. 9 is a detail flowchart of risk value prediction according to still another example of the present disclosure.

Refer to FIG. 9, a detail flowchart of risk value prediction according to still another example of the present disclosure. Similar to the above FIG. 7, the characteristics extracted by the triplet loss model can be repeatedly utilized, and the extracted characteristics are input to the above risk value prediction model (step 700). A step 800 is as described above and is not repeated herein.

In some examples, besides the characteristics extracted by the triplet loss model, other characteristics can be input to the risk value prediction model, such as characteristics of personal data (like gender and age), physical body data (like body mass index (BMI), height and weight), and medical information (disease history (like diabetes and hypertension)). The characteristics can be input by a user through a user interface, and can also be read from a medical record database.

Figure 10:
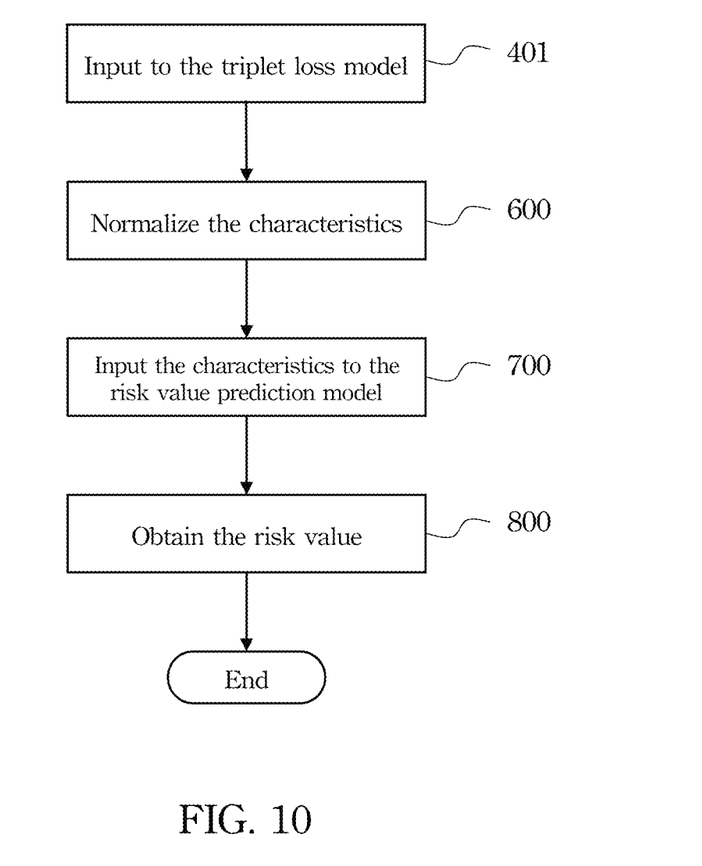
FIG. 10 is a detail flowchart of risk value prediction according to yet another example of the present disclosure.

Refer to FIG. 10, a detail flowchart of risk value prediction according to yet another example of the present disclosure. Similar to the above FIG. 8, the step 600 of normalizing the extracted characteristics into the numerical range between 0 and 1 is performed before the step 700.

Figure 11:
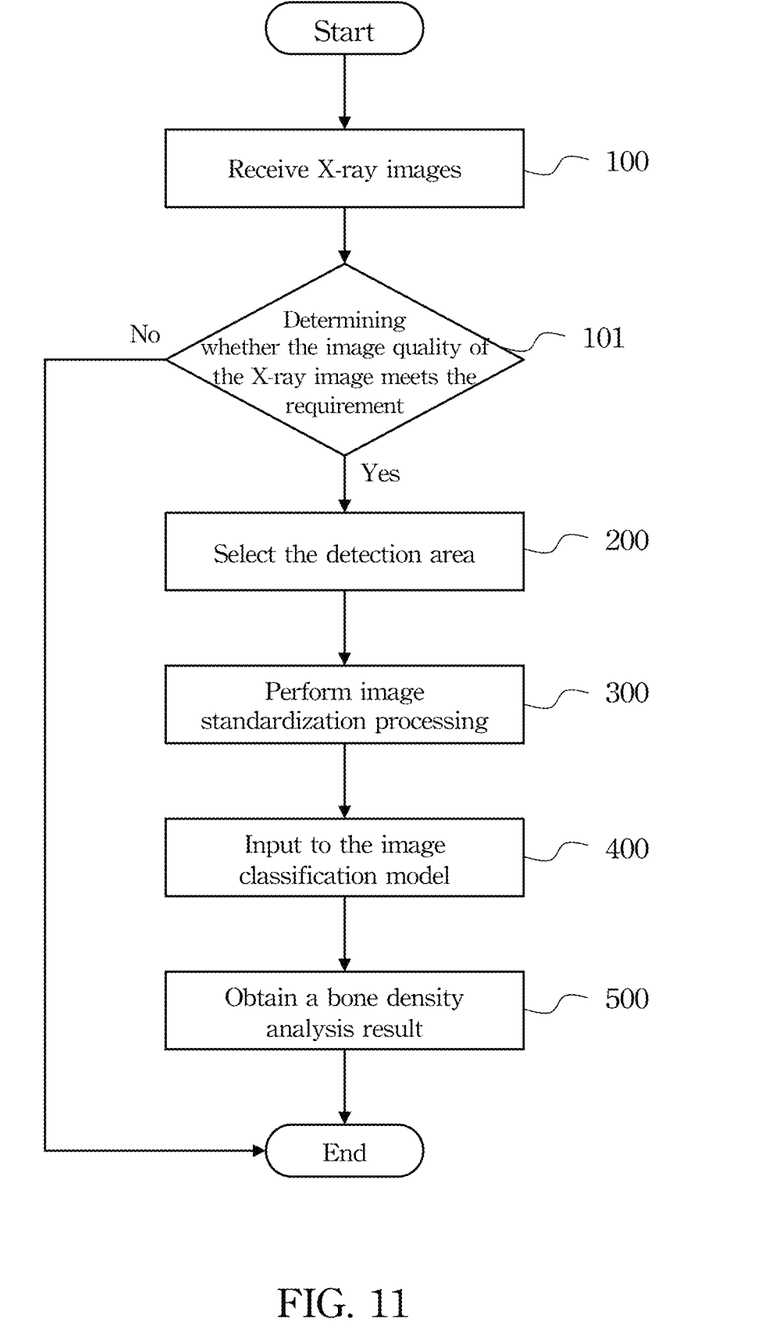
FIG. 11 is a flowchart of a medical image analysis method according to another example of the present disclosure.

Refer to FIG. 11, a flowchart of a medical image analysis method according to another example of the present disclosure. The difference from FIG. 1 is that FIG. 11 is to analyze the medical images which are X-ray images to obtain the bone density analysis result, and a step 101 is further performed.

Figure 12A:
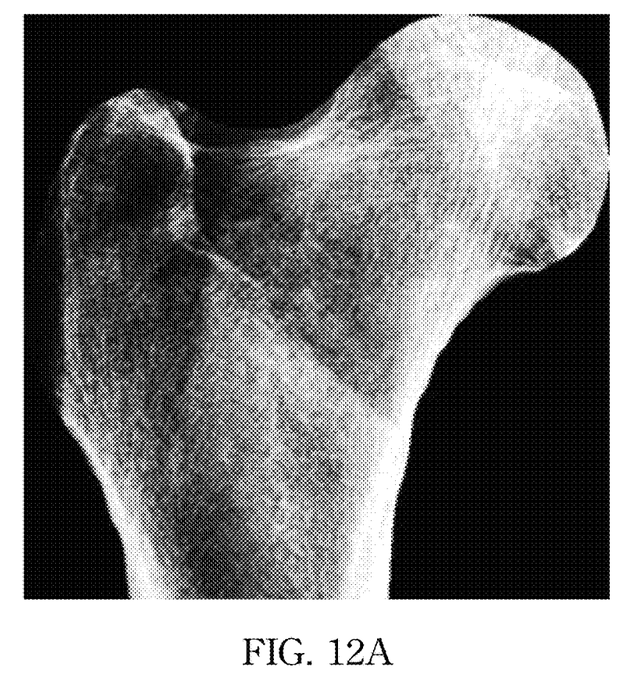
FIG. 12A is a schematic diagram of an X-ray image meeting requirements.
Figure 12B:
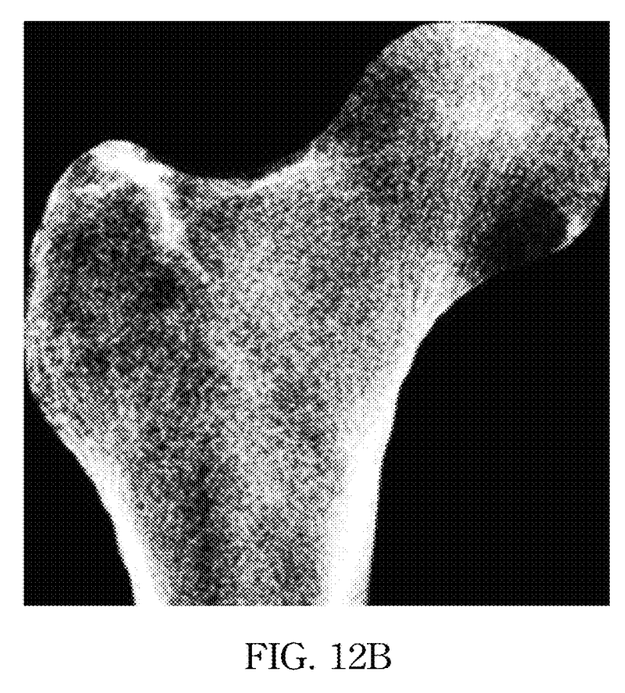
FIG. 12B is a schematic diagram of an X-ray image not meeting requirements.
Figure 12C:
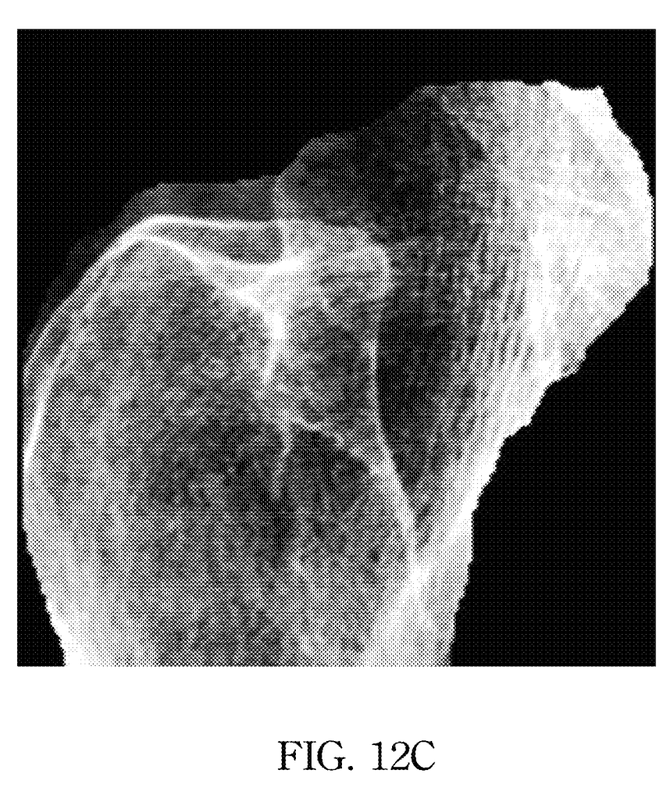
FIG. 12C is a schematic diagram of another X-ray image not meeting requirements.

The step 101 comprises: determining whether the image quality of the X-ray image meets the requirement. If the image quality of the X-ray image meets the requirement, the subsequent steps are performed; and if the image quality of the X-ray image does not meet the requirement, the flow is finished. Specifically, the image quality of the X-ray image can be detected through operator functions such as canny, focus, sobel and laplacian in this step. For example, a threshold value can be set, the result obtained after performing one of the above operator functions on the X-ray image is compared with the threshold value, and if the result is lower than the threshold value, the requirement is met. For example, the sobel operator can be used for calculating gradients in the horizontal and vertical directions, and if the gradient value is too high, the image includes excessive noise. FIG. 12A is a schematic diagram of an X-ray image meeting requirements. FIG. 12B is a schematic diagram of an X-ray image not meeting requirements, and shows excessive noise points. FIG. 12C is a schematic diagram of another X-ray image not meeting requirements, and shows several horizontal textures. Therefore, whether the textures in the X-ray image are clear enough can be detected to screen out the image clear enough and avoid the error of the subsequent determination result.

In some examples, multiple operator functions can be adopted, and each operator function corresponds to a threshold value; and when the calculation results of the operator functions are lower than the corresponding threshold values, it can be determined that the image quality of the X-ray image meets the requirements.

The above medical image analysis method is implemented by loading through a computer and executing a computer program product. The computer program product consists of multiple program instructions and is stored in a non-transient computer readable medium. The computer can be a personal computer, a server and other calculation apparatuses with operational capability for example. The computer generally comprises a processing unit (such as a central processing unit and a graphic processor), a memory, a storage medium (such as a hard disk), an input/output interface, a network interface and other hardware resources.

In some examples, the computer can be connected with a medical image storage system (such as a picture archiving and communication system (PACS)) or a medical detection instrument to acquire the medical image.

In conclusion, according to the medical image analysis method in the example of the present disclosure, possible diseases can be automatically analyzed according to the medical image. According to some examples, a risk value can be further analyzed.

What is claimed is:

1. A medical image analysis method, executed by a computer, comprising:
   receiving medical images;
   selecting at least one detection area in the medical image;
   performing image standardization processing on a target image in the detection area to obtain a to-be-analyzed image;
   inputting the to-be-analyzed image to an image classification model to obtain a disease analysis result;
   wherein the image classification model comprises a triplet loss model;
   wherein the step of inputting the to-be-analyzed image to the image classification model comprising:
   performing dimension reduction on the output result of the triplet loss model through principal component analysis to transform to obtain a coordinate point; and
   obtaining an analysis type of the to-be-analyzed image according to a group range of the coordinate point.

2. The medical image analysis method according to claim 1, further comprising:
   integrating the analysis type of all the to-be-analyzed images to obtain the disease analysis result.

3. The medical image analysis method according to claim 1, wherein the step of selecting the detection area is implemented through an object detection model.

4. The medical image analysis method according to claim 1, further comprising:
   determining that the medical image meets quality requirements, wherein the medical image is an X-ray image.

5. A medical image analysis method, executed by a computer, comprising:
   receiving medical images;
   selecting at least one detection area in the medical image;
   performing image standardization processing on a target image in the detection area to obtain a to-be-analyzed image;
   inputting the to-be-analyzed image to an image classification model to obtain a disease analysis result;
   wherein the image classification model comprises a convolutional neural network and a triplet loss model;
   wherein the step of inputting the to-be-analyzed image to the image classification model comprising:
   inputting the to-be-analyzed images to the convolutional neural network, and obtaining a characteristic vector through the output of the convolutional neural network;
   inputting the characteristic vector to the triplet loss model;
   performing dimension reduction on the output result of the triplet loss model through principal component analysis to transform to obtain a coordinate point; and
   obtaining an analysis type of the to-be-analyzed image according to a group range of the coordinate point.

6. The medical image analysis method according to claim 5, further comprising:
   integrating the analysis type of all the to-be-analyzed images to obtain the disease analysis result.

7. The medical image analysis method according to claim 5, further comprising:
   inputting multiple characteristics extracted by the image classification model to a risk value prediction model to obtain a risk value.

8. The medical image analysis method according to claim 7, wherein before inputting the characteristics to the risk value prediction model, the method further comprises:
   normalizing the characteristics.

9. The medical image analysis method according to claim 7, wherein the risk value prediction model is a multilayer perceptron.

10. A medical image analysis method, executed by a computer, comprising:
    receiving medical images;
    selecting at least one detection area in the medical image;
    performing image standardization processing on a target image in the detection area to obtain a to-be-analyzed image;
    inputting the to-be-analyzed image to an image classification model to obtain a disease analysis result;
    wherein the step of inputting the to-be-analyzed image to the image classification model comprising:
    correspondingly inputting each to-be-analyzed image to the image classification model to correspondingly classify the to-be-analyzed image to an analysis type; and
    taking the majority in the analysis type of the to-be-analyzed images as the disease analysis result.

* * * * *